Apr. 17, 1923.
R. A. NEAL
BRAKE ACTUATING MECHANISM
Filed July 20, 1921     2 Sheets-Sheet 1
1,452,212
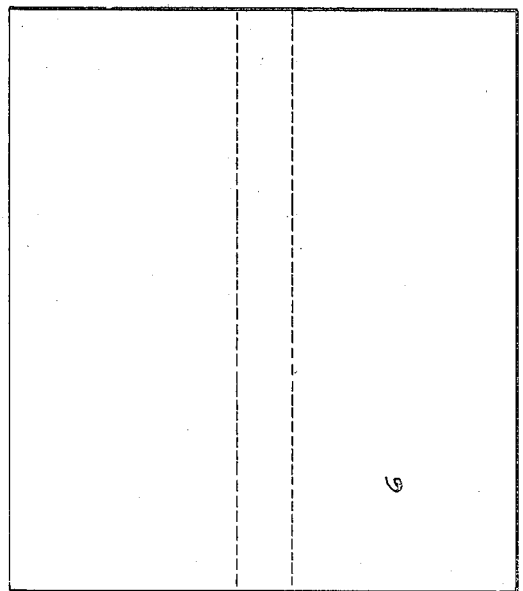
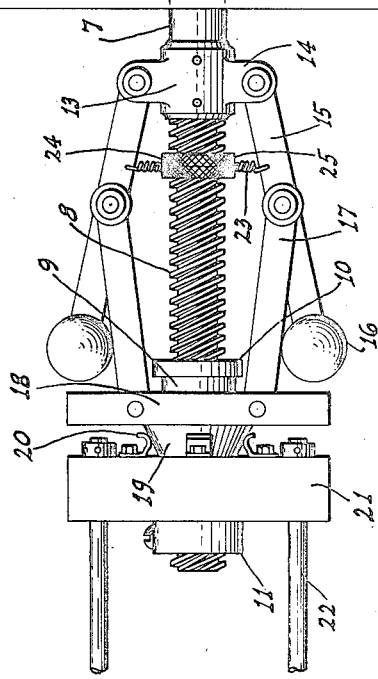
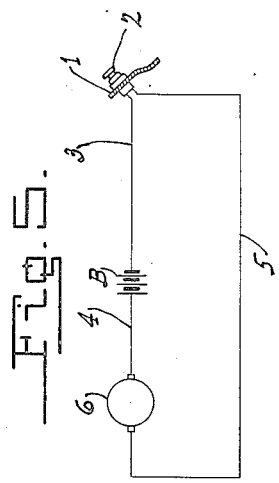
Inventor
R. August Neal
By Watson E. Coleman Attorney Apr. 17, 1923.  1,452,212
R. A. NEAL
BRAKE ACTUATING MECHANISM
Filed July 20, 1921   2 Sheets-Sheet 2
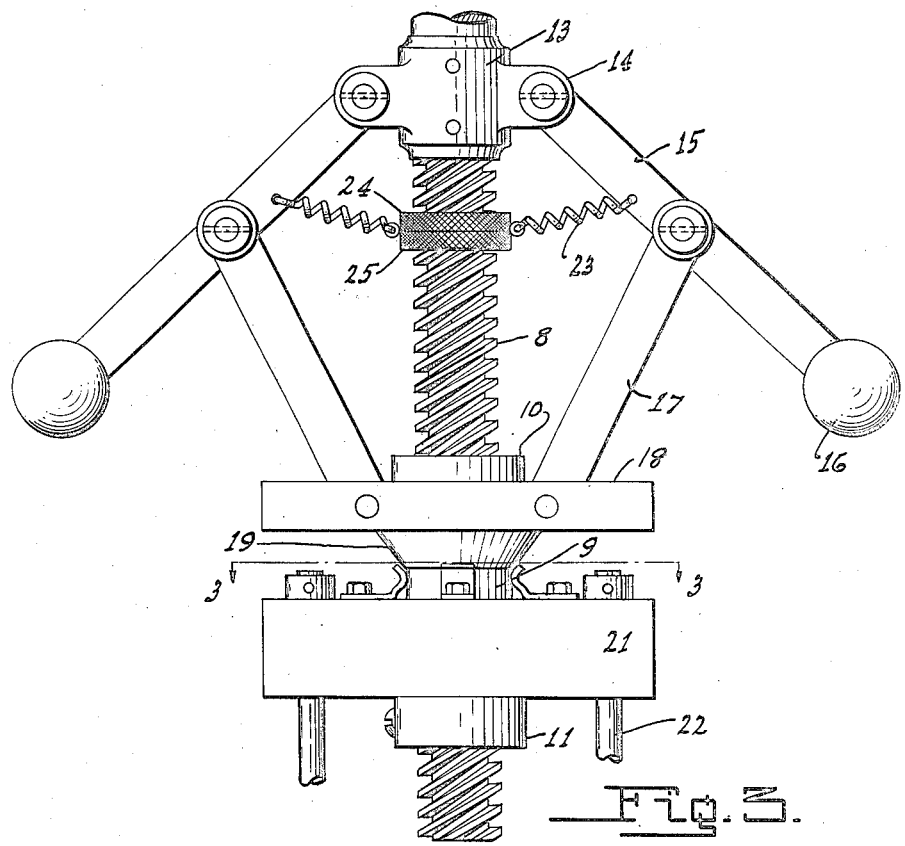
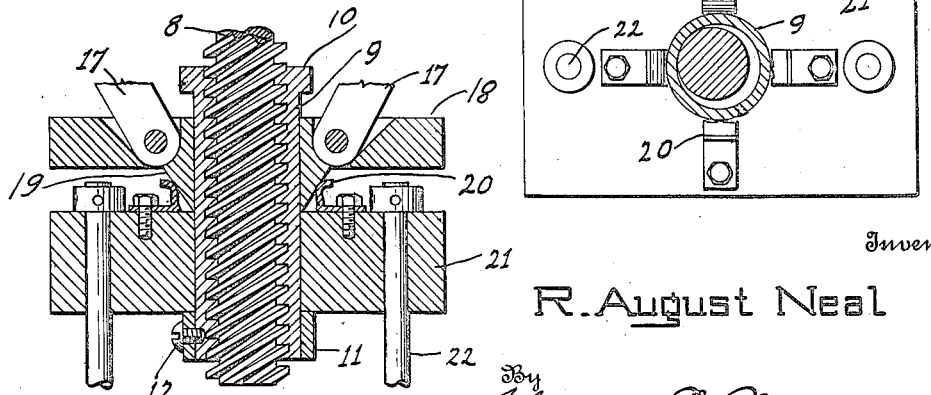
Inventor
R. August Neal Patented Apr. 17, 1923.

1,452,212

UNITED STATES PATENT OFFICE.

ROBERT AUGUST NEAL, OF LEXINGTON, KENTUCKY, ASSIGNOR OF ONE-HALF TO LAURENCE J. HEYMAN, OF LEXINGTON, KENTUCKY.

BRAKE-ACTUATING MECHANISM.

Application filed July 20, 1921. Serial No. 486,302.

*To all whom it may concern:*

Be it known that I, ROBERT AUGUST NEAL, a citizen of the United States, residing at Lexington, in the county of Fayette and State of Kentucky, have invented certain new and useful Improvements in Brake-Actuating Mechanisms, of which the following is a specification, reference being had to the accompanying drawings.

This invention relates to brake actuating mechanisms and more particularly to an electrically controlled brake actuating mechanism for automobiles.

The principal object of the invention is to provide a simple and efficient device which will effectively apply the brakes of the machine without any material effort on the part of the operator and which mechanism is restored to normal position automatically immediately the current ceases to flow through the actuating motor.

Another object of the invention is the provision of a brake actuating mechanism which may be controlled through an electrically operated motor in such manner that the operator of the vehicle does not have to release his hand from the wheel of the vehicle thereby enabling him at all times to have absolute control of the steering mechanism and the brakes.

Further objects of the invention will appear as the following specific description is read in connection with the accompanying drawings which form a part of this application and in which:

Figure 1 is a plan view showing the motor in diagram and the parts in inactive position, Figure 2 is a detail plan showing the parts in operative position to apply the brakes, Figure 3 is a section taken on the line 3—3 of Figure 2, Figure 4 is a detail longitudinal section, and Figure 5 is a diagram of a conventional circuit for operating the device.

Referring more particularly to the drawings and particularly to Figure 5, 1 represents a spoke of the steering wheel of a vehicle which carries a push button switch 2 or any other suitable type of switch for controlling the current over the wires 3, 4 and 5 leading from the switch to the battery, from the battery to the motor 6 and from the motor back to the switch.

The shaft of the motor is indicated at 7 and is provided on an extended end thereof with screw threads 8 which screw into an elongated sleeve 9 as is clearly shown in Figure 4. This sleeve has an integral collar on its inner end indicated at 10, and upon its outer end is a removable collar 11 held in place by a set screw 12, also shown in Figure 4.

Mounted upon and secured to the shaft 7 inwardly of the screw threads 8 is a sleeve 13 having laterally extended ears 14 to which are pivoted the governor arms 15 having the weighted balls 16 upon their outer ends, as is usual. These arms have pivoted thereto intermediate their length the connecting links 17 which are in turn pivoted to the hub member 18 carrying upon its outer side a conical clutch disengaging member 19.

This hub member is loosely mounted upon the sleeve 9 so that when the motor is started the hub member 18, cone 19, sleeve 9 and shaft 8 rotate as a unit. The clutch disengaging cone 19 when in normal or inactive position engages and holds out of operative position the clutch springs 20 mounted upon the brake yoke 21. When, however, the governor balls are expanded by centrifugal action due to the speed of the motor shaft, the clutch disengaging action is withdrawn from the springs and they are then, by their inherent resiliency, brought into contact with the sleeve 9 thus holding the sleeve stationary with respect to the screw which causes the screw to thread itself therein and pull the sleeve toward the motor in such position as indicated in Figure 2. The yoke 21 and sleeve 9 are stationary in so far as the rotation of the screw is concerned and as the sleeve moves inwardly upon the screw, the brake yoke with its accompanying brake rods 22 are forcibly pulled toward the motor and the brakes applied.

While I have not shown any springs for normally holding the brake shoes out of engagement with the brake drums, this construction is well understood and it, will therefore, be understood that when the rotation of the motor is stopped by reason of the switch 2 being open, the governor balls will be returned to normal position by the springs 23 secured to the adjusting nut 24 and the cone clutch disengaging member forced between the springs and the sleeve to move the springs to the position shown in Figures 1 and 4. Thus, the springs which return the brake shoes to inactive position will pull upon the yoke 21 through the rods 22 and pull the sleeve 9 toward the outer end of the shaft, the sleeve being able to rotate freely in the yoke by reason of the fact that at this time the springs 20 are disengaged therefrom.

A suitable lock nut 25 is threaded upon the shaft and is adapted to jam against the nut 24 to hold the same in adjusted position. By adjusting the nut 24, the tension of the springs 23 may be properly regulated so that the governor balls will be returned to normal position immediately upon cessation of the current passing through the motor.

It will be seen that by providing a device of this character with a control switch located on the steering wheel of the vehicle the operator of the vehicle is enabled at all times to maintain absolute control of the steering mechanism and of the brakes. Furthermore, he does not have to exert any material effort in applying the brakes as is now customary with the ordinary foot brakes which this device is intended to replace. It will also be seen that the mechanism is very simple and having few parts will be found to be durable and efficient in action.

I claim:

1. In combination with a brake yoke and brake rods therefor, an actuating member loosely mounted in the brake yoke, a motor, and means driven by the motor for causing the actuating member to pull upon the yoke and apply the brake.

2. In combination with a brake yoke and brake rods therefor, an actuating member loosely mounted in the brake yoke, a motor means actuated by the motor for causing said member to pull upon the brake yoke to apply the brakes, and means for controlling the action of the motor.

3. In combination with a brake yoke and brake rods, a sleeve loosely mounted in the brake yoke, an electric motor having a threaded shaft threaded in the sleeve, and means operable upon actuation of the motor to hold the sleeve stationary with the yoke.

4. In combination with a brake yoke and brake rods, an internally threaded sleeve loosely mounted in the yoke, a motor having a threaded shaft threaded into the sleeve, and means carried by the yoke and actuated upon operation of the motor to lock the sleeve to the yoke.

5. In combination with a brake yoke, and brake rods, of an internally threaded sleeve loosely journaled in the yoke, a motor having a threaded shaft engaged in the sleeve, a governor carried by the shaft, and means normally held out of engagement with the sleeve when the governor is in inactive position and released to engage with the sleeve when the governor is actuated, said means adapted to lock the sleeve to the yoke.

6. In combination with a brake yoke and brake rods, a motor having a screw threaded shaft, a sleeve threaded upon said shaft and loosely engaged in said yoke, a governor carried by the shaft, clutch members carried by the yoke, and means actuated in the operation of the governor to release the clutch members for engagement with the sleeve whereby the same is locked to the yoke member, said clutch members normally acting to engage the sleeve.

7. In combination, a threaded rotatable shaft, means for rotating the shaft, a sleeve having threaded engagement with the shaft, a brake yoke through which the sleeve is rotatably directed and which is held against rotation, and means operated upon rotation of the shaft for holding the sleeve against rotation with relation to the brake yoke.

8. In combination, a threaded shaft, means for rotating the shaft, a sleeve having threaded engagement with the shaft, a brake yoke through which the sleeve is rotatably directed, said brake yoke having clutched engagement with said sleeve, and means mounted upon the sleeve unclutching said brake yoke from said sleeve when the shaft is stationary and permitting clutching of the brake yoke and sleeve when the shaft is rotated.

In testimony whereof I hereunto affix my signature.

ROBERT AUGUST NEAL.